United States Patent [19]
Pirotta et al.

[11] Patent Number: 5,690,871
[45] Date of Patent: Nov. 25, 1997

[54] PROCESS FOR THE PRODUCTION OF STRUCTURAL THERMOINSULATING ELEMENTS

[75] Inventors: Giampiero Pirotta, Virgilio; Romano Reggiani, Mantova, both of Italy

[73] Assignee: Enichem S.P.A, Milan, Italy

[21] Appl. No.: 564,006

[22] Filed: Nov. 29, 1995

[30] Foreign Application Priority Data

Dec. 1, 1994 [IT] Italy .................. MI94A2436

[51] Int. Cl.$^6$ ............ B29C 44/06; B29C 44/12
[52] U.S. Cl. ............ 264/45.4; 264/127; 249/142
[58] Field of Search ............ 264/45.4, 46.7, 264/127; 249/142

[56] References Cited

U.S. PATENT DOCUMENTS

| | | | |
|---|---|---|---|
| 3,000,058 | 9/1961 | Thielen, Jr. | 264/45.4 |
| 3,163,686 | 12/1964 | Dusel et al. | 264/45.4 |
| 3,825,647 | 7/1974 | Kirsch | 264/277 |
| 3,935,632 | 2/1976 | Maxson | 264/45.4 |
| 4,284,447 | 8/1981 | Dickens et al. | 264/45.4 |
| 4,439,122 | 3/1984 | Besse et al. | |
| 4,693,856 | 9/1987 | Rubens et al. | 264/45.4 |
| 4,900,487 | 2/1990 | Lalloz et al. | 264/45.2 |
| 4,948,541 | 8/1990 | Beck | 264/275 |
| 5,476,618 | 12/1995 | Ito et al. | 264/45.4 |

FOREIGN PATENT DOCUMENTS

| | | | |
|---|---|---|---|
| 1097822 | 7/1955 | France . | |
| 1936908 | 1/1971 | Germany . | |
| 828154 | 2/1960 | United Kingdom | 264/45.4 |

*Primary Examiner*—Allan R. Kuhns
*Attorney, Agent, or Firm*—Watson Cole Stevens Davis, P.L.L.C.

[57] ABSTRACT

Process for the production of thermoinsulating structural elements, which includes:

a) producing by thermoforming a cell made of thermoplastic material;

b) pulling on such cell on a male die half shell;

c) closing the die with a negative half shell suitable to form a cavity between the half shells, d) inserting in the cavity bored hollow elements e) filling the cavity with foamed pearls in thermoplastic polymers;

f) sintering the pearls with steam fed through hollow elements.

g) cooling and extracting the hollow elements h) extracting the structural element from the die.

1 Claim, 3 Drawing Sheets

PROCESS FOR THE PRODUCTION OF STRUCTURAL THERMOINSULATING ELEMENTS

This invention concerns a process for the production of thermoinsulating structural elements and elements obtained from the process. More particularly this invention concerns a process for the production of thermoinsulating structural elements in thermoplastic material provided with internal pipes for the circulation of refrigerated air, and the structural elements obtained from such procedure.

The expression "thermoinsulating structural elements", as it is intended in this description and in the claims, includes any item molded, rigid, semirigid, circular or polygonal used in the transportation field, household appliances, the building industry, automotive manufacturers, telecommunications, office machinery, etc. for example such structural elements include doors, caps, casings, containers, specifically for refrigerators or freezers, acoustic or thermic insulation panels, bolsters, risers, containers, for example for portable thermic bags, partition walls, freezer cells for motor lorries and railway carriages etc.

At present the structural items such as those above described are obtained starting from two half shells which are mechanically assembled by welding or glueing and subsequently the hollow part between the two half shells is filled with cellular polyurethane.

Such technology known for the production of thermoinsulation structural elements presents several disadvantages both of environmental and of technical nature. It is known, in fact, that the use of cellular polyurethane as thermoinsulating material causes ecological problems because it is believed that expanding CFC and HCFC agents are one of the major causes of the alteration and the distruction of the ozone layer in the stratosphere and are agents implicated in the cause of the green house effect.

Moreover, the use of two or three different materials in the production of such insulating structural elements involves recycling problems due to the incompatibility of the materials used.

Finally, the production process of such structural elements is laborious and therefore very costly.

In order to overcome some of these disadvantages it has been suggested to substitute cellular polyurethane with foamed sintered pearls of a thermoplastic material such as polystyrene, in which, as it is known, the expanding agent is a low-boiling hydrocarbon. Processes for the production of thermoinsulating structural elements containing sintered foamed pearls of thermoplastic material are well known in the patent literature and are described, for example, in the Italian patents No. 1,185,507 and 1,202,484 and in the published European patent applications No. 410,432 and 512,609.

Such processes allow one to solve problems of generating environmental pollution as well as overcoming the material recycling problems, but still they have the disadvantage of being laborious because they involve several operations that increase the cost of the final structural element.

Such processes involve (i) the application of a layer of pearls of foamed or semifoamed thermoplastic polymer on the concave or convex part of a first thermoplastic half shell in order to form a layer whose thickness is constant, (ii) sintering the pearls with steam and, (iii) applying and fixing a second half shell which can be made of the same thermoplastic material that forms the first half shell.

Moreover, these processes do not allow the integration of different functions in the molding stage, which are to be executed subsequently, with additional cost increase. Thus, for example, the thermoinsulating structural element must be provided with refrigerated air pipes, when such structural elements are to be used in the refrigeration field. This is disadvantageous due both to the fact that such pipes are generally made of a different material which is not compatible with the structural element and it requires additional assembly.

The Applicant has now found that these limitations and disadvantages in the known processes can be overcome by producing the refrigerated air pipes directly in the structural element body and during the stage of sintering of the foamed or semifoamed pearls. For that purpose, the pearls sintering is executed by using movable, hollow, bored elements with the same external dimensions and geometry as the pipes to be built, through which is fed the sintering steam.

The movable, hollow, and bored elements perform the double duty in acting as sintering steam distributors and as inserts for the formation of the pipes.

It is therefore an object of the present invention to produce thermoinsulating structural elements provided with pipes for the circulation of refrigerated air; the process consists of:

a) Producing a thermoplastic material cell by thermoforming;

b) Pulling said cell on the male half shell of a mold for the production of the structural element;

c) closing the mold, inserting said male half shell in the correspondent negative half shell of said mold in order to form an intermediate cavity between said half shells;

d) inserting hollow, bored elements with the same external dimensions and geometry as the pipes to be built in said cavity at the point where the pipes are foreseen;

e) filling the cavity with foamed or semifoamed pearls or granules in thermoplastic material;

f) feeding saturated steam or hot air through said hollow elements in order to sinter the pearls;

g) cooling and extracting said movable elements from the mold, and h) extracting the thermoinsulating structural element which is provided with pipes within its mass.

The hollow, movable and bored elements and the pipes to be built are equal in number and are to be inserted in the same places wherein the pipes are foreseen. The cross section of such hollow elements can be elliptical, circular, rectangular, square or generally polygonal, according to the final use of the thermoinsulating structural element.

Said hollow elements can be made of alluminium, copper or their alloys, steel, stainless steel, teflonate metal, thermosetting resins with a smooth and polished surface in order to have the minumum friction with the sintered product. The surface of such hollow elements is provided with holes or "pellets" for the passage and distribution of steam or hot air for the sintering process. Steam is fed within such hollow elements by pressure which is a function of several factors such as the mass that has to be sintered, the overall mold mass, the thermal gap and the area of contact between the hollow elements and pearls to sinter. Generally the pressure of saturated steam can vary between 0.1 and 2 bar and can be the same or it can vary in each hollow element.

Also the time during which steam is injected in the mold is variable in relation to the parameters listed above and to the steam pressure and it can change also from one element to the next; time can be regulated by a timer, according to known technologies. Timing between 5 and 100 seconds can be used.

The cell in thermoplastic material can be produced by means of any known thermoforming process, such as for example by blow molding of a thermoplastic polymer in a mold consisting of two half molds which define the molding compartment of the cell. The mold can be provided with movable parts consisting of elastically flexible bars or movable bosses or other known means for molding channels with dovetail form, of pack draft parts, asymmetric sectioned undercuts, hollowed or projectioned areas etc., according to the use of the thermoinsulating structural element.

The thickness of the cell walls is not fundamental for the present invention procedure, generally it is between 0.3 and 10 mm.

Any polymeric thermoplastic material that is suitable to give foamed or semifoamed pearls or granules can be used in the present invention procedure for the production of both the cell and the pearls or the granules forming the thermoinsulating structural element. Eventhough polystyrene and high-impact polystyrene (HIPS) are to be preferred, other thermoplastic polymeric materials can be used. Examples of alternative polymeric materials that can be used are the following: polystyrene modified with polar monomers such as acrylonitrile, ABS resins, high, medium and low density polyethylene, polypropylene, thermoplastic ethylene/propylene copolymers, polyvinyl chloride, acrylic and metacrylic resins, such as polymetacrylates, etc., and their mixtures.

As thermoplastic polymeric material also compatible mixtures including polystyrene, high-impact polystyrene (HIPS) and/or polystyrene modified with polar monomers can be used, as well as at least one technopolymer such as for example polyphenylene ether, polycarbonate, polyolefins, polyesters such as polyethylene terephtalate, polybutylene terephthalate etc.

High-impact polystyrene known on the market with EDISTIR® trademark and the polystyrene foamed pearls known on the market with EXTIR® and EGOSTYR® trademark, all produced and sold by the Applicant, are preferred in the process of this invention.

The male and female mold half shells are preferably made of alluminium, copper or their alloys in order to facilitate the thermic exchange both during the sintering and cooling stages.

Once the male half shell is introduced in the negative half shell in order to form an intermediate cavity and once the hollow elements are in such cavity, the foamed and semifoamed pearls or granules are put in the cavity, preferably by compressed air injectors and with the help of the vacuum applied to the cavity, according to known techniques. In order to remove the air contained among pearls or granules in the cavity and to guarantee a complete adhesion among the pearls and granules and the halfshells walls, it is possible to effect a stripping step in steam current in the form of saturated steam impulses, preferably with a pressure that is greater than atmospheric pressure, and optionally alternated with cycles of decreased pressure phases.

Once the filling of the mold cavity is completed, the foamed or semifoamed pearls or granules undergo a sintering process.

The sintering process is carried out by saturated steam or hot air having a temperature greater than the transition to glass (Tg) temperature of pearls or granules, injected in the cavity through the hollow elements holes.

In some cases it is convenient to aspirate the steam or air during the sintering process by creating a vacuum. For this purpose the aspiration devices are preferably set in the same area as the hollow elements.

The total surface of the aspiration devices is at least equal or greater than the total surface of the hollow elements for the adduction of steam or hot air.

During the sintering process, the cell walls are mantained at a temperature at least 10° C. below the transition to glass temperature (Tg) of the polymeric material that forms such cell.

The temperature control can be carried out with water cooling in closed circuit or by spraying controlled quantities of water directly on the mold walls that touch directly the cell walls.

A switch controlled by a thermic gauge directly touching the mold wall for the regulation of the quantity of water sprayed or fed according to the desired temperature and to known techniques.

For example, the transition to glass temperature of polystyrene is between 80° and 120° C. and that of foamed or semifoamed pearls or granules is between 70° and 110° C.

BRIEF DESCRIPTION OF THE DRAWINGS

For a better understanding of the invention, a detailed description follows with reference to the enclosed figures FIG. 1 schematically shows the beginning stage of the process of this invention.

DETAILED DESCRIPTION OF THE INVENTION

Figure 1:
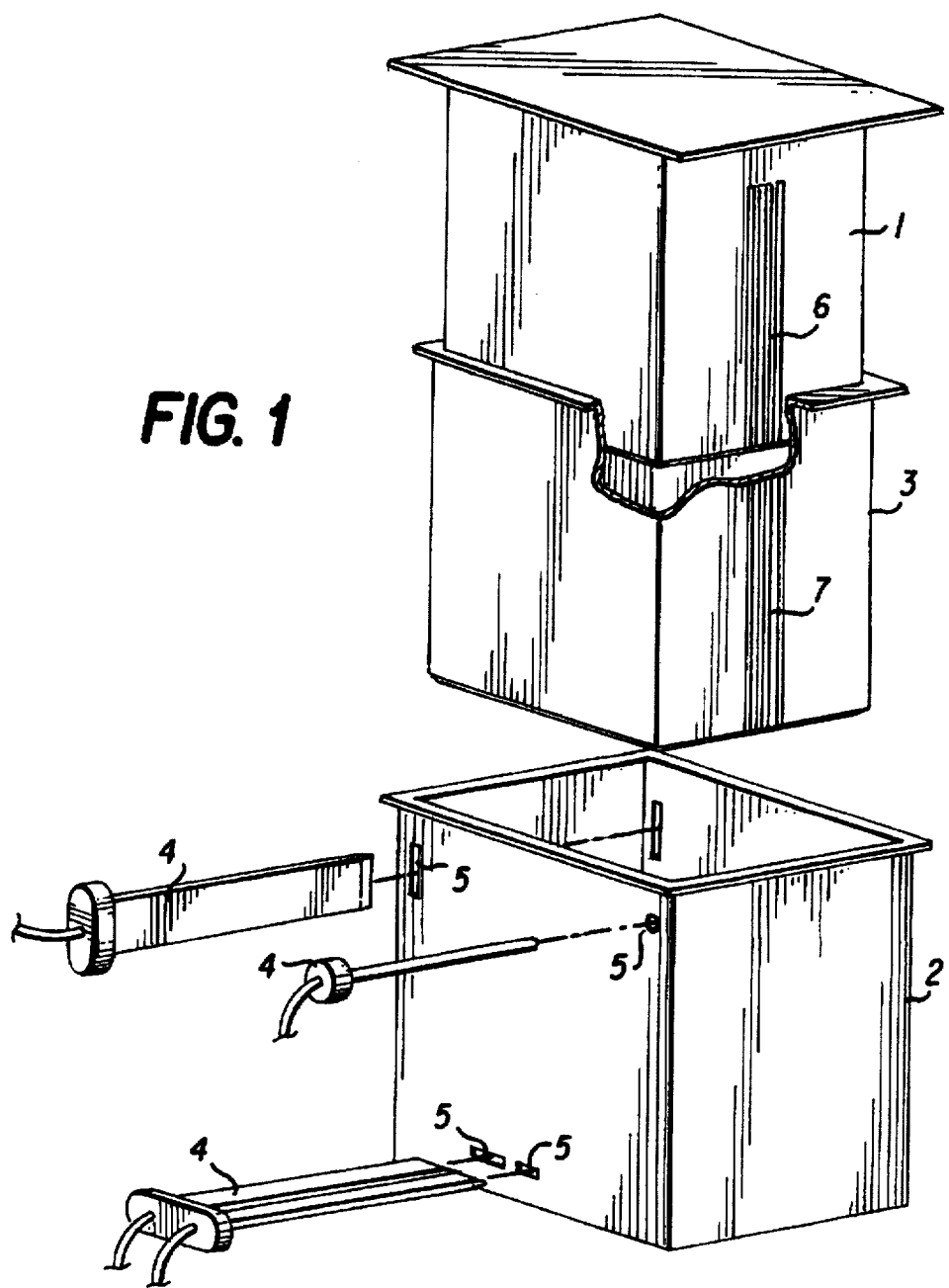

Referring to the figures, the object procedure of this invention consists of the production of a refrigerating cell (3) by hot thermoforming of an extruded high impact polystyrene sheet EDISTYR® SRL800 produced and sold by the Applicant, having a thickness of 1 mm and provided at least on one side of parallel channels (7).

The cell (3) is put on a male cover die (1) of an alluminium die provided with a conventional and known thermostating system. The male cover die (1) is also provided with channels (6) along at least one side which mate with the cell channels (7) when pulled on it (3).

The male cover die (1) with the cell pulled on is inserted in the negative die (2). The dimentions of the negative die (2) are correlated to the male cover die's(1) in order to form a hollow space or intermediate cavity between the two cover dies, with a thickness corresponding to the wanted insulating layer. Generally the thickness is about 2–20 cm.

The negative die cover (2) is provided with passing holes(5) on the opposite surfaces and in peripheral portions corresponding to the intermediate cavity. The passing holes can be single or mated and their form and dimension are the same as those of the pipes to be built.

Once the male half shell (1) with its cell (3) is inserted in the negative shell(2), the bored hollow elements(4) are put inside the intermediate cavity and through the passing holes (5).

Saturated steam is introduced through a pipe in the cavity of such hollow elements (4).

Figure 5:
FIG. 5 represents the schematic cross-section view of the hollow element of FIG. 4 with a plane passing along the line A—A.
Figure 7:
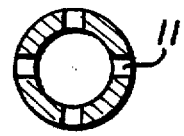
FIG. 7 represents the schematic cross section of the bored hollow element of FIG. 6 with a plane passing along the line B—B.
Figure 2:
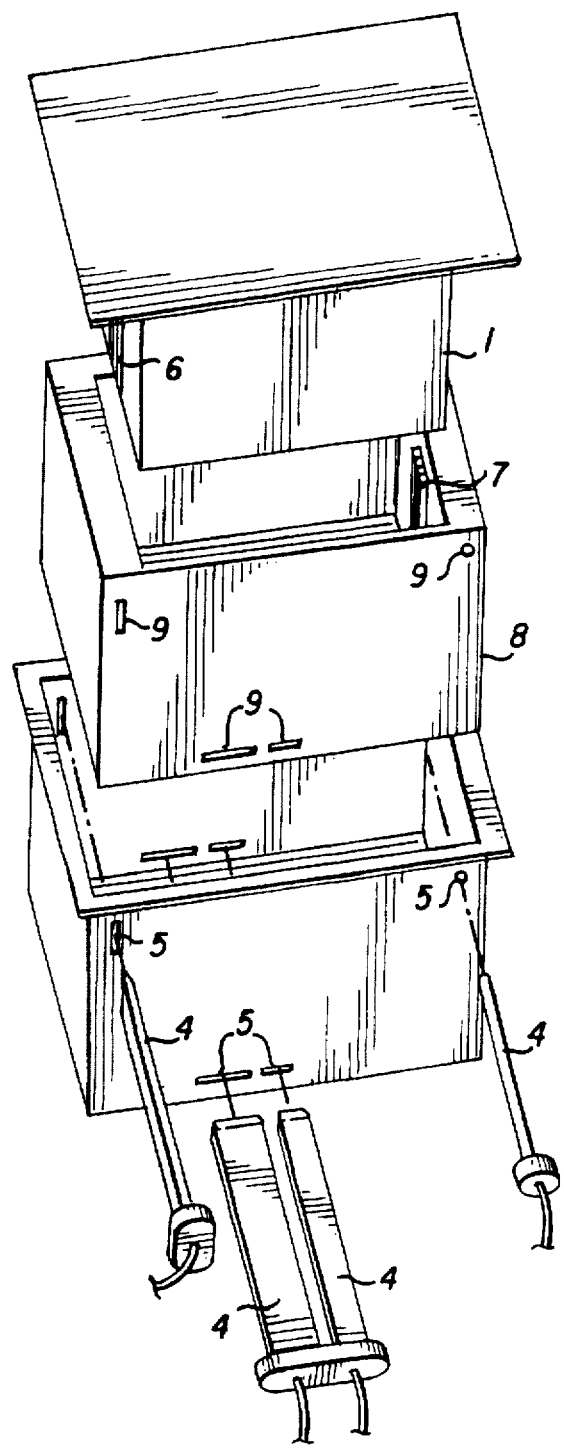
FIG. 2 schematically shows the final stage of the process of the present invention.
Figure 6:
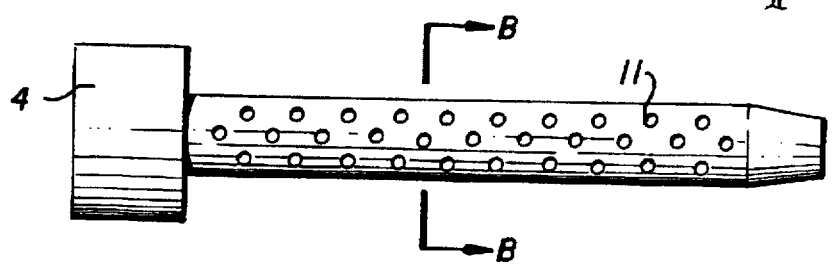
FIG. 6 represents the schematic lateral view of another hollow element.
Figure 3:
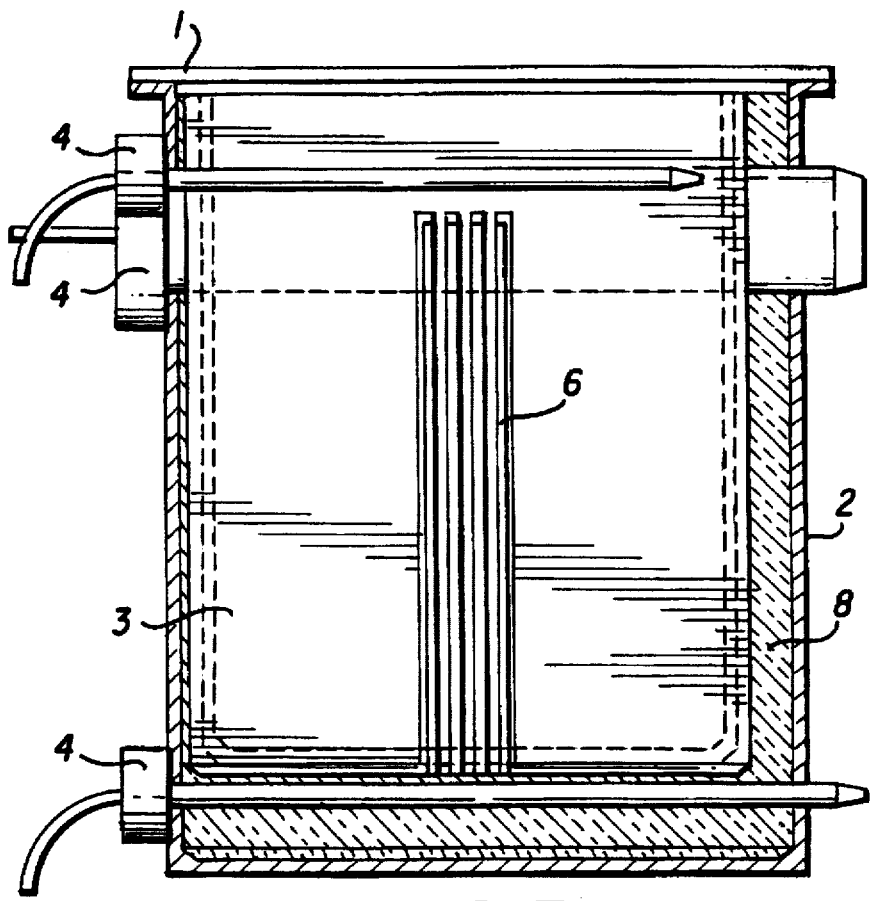
FIG. 3 shows the schematic view of a cross section of the mold during the sintering stage.
Figure 4:
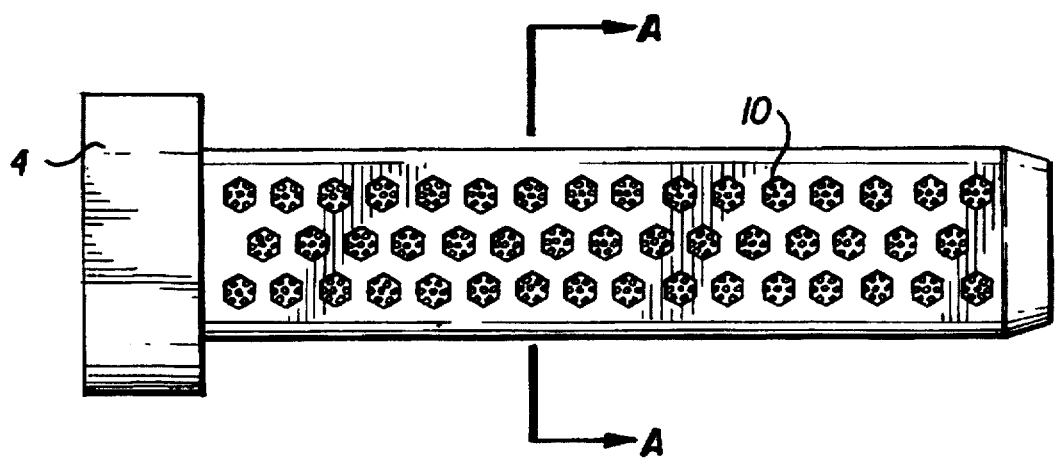
FIG. 4 represents the schematic lateral view of a bored hollow element.

As shown in FIGS. 4, 5, 6 and 7, the bored hollow elements (4) can have circular, elliptical, square, rectangular or polygonal cross section and have passing holes(11) or vaporizor "pellets" (10). The holes' diameter (11) can vary between 0.1 and 10 mm and that of the pellets (10) between 3 and 20 mm.

The hollow elements (4) can either cross the whole mold from side to side, or can end within the intermediate cavity, according to the pipe to be built.

The intermediate cavity is then filled with foamed pearls made of polystyrene, which is available on the market with the trade mark ECOSTIR® PD I 3000, which has a density of 30 g/l, and is produced and sold by the Applicant. During the loading of the pearls, within the cavity a vacuum of 0.3–0.5 kg/cm2 is created. The foamed pearls are then sintered by injecting saturated steam at 0.65 bar through the hollow elements (4)holes(11) and pellets(10). During the sintering process the temperature of male cover die walls(1) is mantained at 55° C. by means of water cooling.

At the end of the sintering cycle, the hollow elements(4) are cooled and retrieved from the holes (5). Subsequently the two cover dies (1,2) are opened and the completed structural element (8) retrieved.

The thermoinsulating structural element (8) obtained presents an excellent sintering of the pearls, adhesion of the sintered foamed pearls to the cell(3), absolute absence of deformations and well defined edges.

Moreover, the element is provided with pipes (9) obtained from the walls and with an internal surface well sintered with skin effect.

We claim:

1. Process for the production of thermoinsulating structural elements and fluid circulation pipes thereon, consisting of:

a) producing a thermoplastic material by thermoforming;

b) pulling said material onto a male half shell of a mold for the production of a structural element;

c) closing the mold by inserting said half shell in the corresponding negative half shell of said mold in order to form an intermediate cavity between said half shells;

d) inserting a plurality of hollow bored elements with the same external dimensions and geometry as pipes to be produced in the intermediate cavity;

e) filling said intermediate cavity with foamed or semi-foamed pearls or granules of a thermoplastic polymer;

f) sintering the pearls by feeding saturated steam or hot air through said hollow elements, and maintaining walls of the thermoplastic material at a temperature of at least 10° C. below the glass transition temperature of the thermoplastic material;

g) cooling the sintered pearls and extracting said hollow bored elements from the mold; and h) removing from the mold the thermoinsulating structural element with produced pipes.

* * * * *